(12) United States Patent
Yun

(10) Patent No.: US 10,930,967 B2
(45) Date of Patent: Feb. 23, 2021

(54) METHOD FOR MANUFACTURING ELECTRODE FOR LITHIUM SECONDARY BATTERY, AND ELECTRODE FOR LITHIUM SECONDARY BATTERY MANUFACTURED THEREBY

(71) Applicant: LG CHEM, LTD., Seoul (KR)

(72) Inventor: Hyunwoong Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 212 days.

(21) Appl. No.: 16/076,433

(22) PCT Filed: Sep. 1, 2017

(86) PCT No.: PCT/KR2017/009586
§ 371 (c)(1),
(2) Date: Aug. 8, 2018

(87) PCT Pub. No.: WO2018/044112
PCT Pub. Date: Mar. 8, 2018

(65) Prior Publication Data
US 2019/0074537 A1  Mar. 7, 2019

(30) Foreign Application Priority Data

Sep. 1, 2016 (KR) .................. 10-2016-0112645
Aug. 31, 2017 (KR) .................. 10-2017-0111351

(51) Int. Cl.
*H01M 10/052* (2010.01)
*H01M 4/66* (2006.01)
(Continued)

(52) U.S. Cl.
CPC ....... *H01M 10/052* (2013.01); *H01M 4/0404* (2013.01); *H01M 4/13* (2013.01);
(Continued)

(58) Field of Classification Search
CPC ...... H01M 10/052; H01M 4/139; H01M 4/13; H01M 4/0404; H01M 4/1391;
(Continued)

(56) References Cited

U.S. PATENT DOCUMENTS 5,981,107 A  * 11/1999 Hamano ................ H01M 4/04
429/231.95
2002/0117469 A1  8/2002 Jito et al.
(Continued)

FOREIGN PATENT DOCUMENTS

CN  102691066 A  9/2012
CN  102959775 A  3/2013
(Continued)

OTHER PUBLICATIONS

Nishi, Y. Lithium Ion Secondary Batteries; Past 10 Years and the Future. Journal of Power Sources 2001, 100, 101-106. (Year: 2001).*

(Continued)

*Primary Examiner* — William P Fletcher, III
(74) *Attorney, Agent, or Firm* — Birch, Stewart, Kolasch & Birch, LLP

(57) ABSTRACT

A method for preparing an electrode for a lithium secondary battery including forming a primer layer including a conductor on a current collector; forming a patterned primer layer by forming a concave pattern through irradiating an ion beam over the whole primer layer surface; and forming an electrode layer including an electrode active material on the patterned primer layer.

10 Claims, 1 Drawing Sheet

(51) Int. Cl.
  *H01M 4/139* (2010.01)
  *H01M 4/13* (2010.01)
  *H01M 4/04* (2006.01)
  *H01M 4/1391* (2010.01)
  *H01M 4/62* (2006.01)

(52) U.S. Cl.
  CPC .......... *H01M 4/139* (2013.01); *H01M 4/1391* (2013.01); *H01M 4/623* (2013.01); *H01M 4/625* (2013.01); *H01M 4/661* (2013.01); *H01M 4/667* (2013.01); *H01M 4/668* (2013.01)

(58) Field of Classification Search
  CPC ...... H01M 4/623; H01M 4/625; H01M 4/661; H01M 4/667; H01M 4/668; C23C 14/048; C23C 14/3442; H01J 2237/082; H01J 37/3174; H01J 37/305; H01J 37/30; H01J 2237/30; H01J 2237/3175; H01J 2237/31749; H01J 2237/31713
  See application file for complete search history.

(56) References Cited

U.S. PATENT DOCUMENTS

| | | | |
|---|---|---|---|
| 2003/0194605 A1* | 10/2003 | Fauteux | H01M 10/6553 429/149 |
| 2005/0112469 A1 | 5/2005 | Goto et al. | |
| 2010/0291442 A1 | 11/2010 | Wang et al. | |
| 2012/0214066 A1 | 8/2012 | Miller et al. | |
| 2013/0108922 A1 | 5/2013 | Shinozaki et al. | |
| 2013/0143126 A1 | 6/2013 | Jung et al. | |
| 2013/0216905 A1 | 8/2013 | Ichikawa | |
| 2014/0162122 A1 | 6/2014 | Kato et al. | |
| 2015/0037597 A1* | 2/2015 | Kim | B81C 1/00492 428/448 |
| 2016/0099470 A1 | 4/2016 | Kwon et al. | |
| 2017/0222278 A1 | 8/2017 | Kwon et al. | |

FOREIGN PATENT DOCUMENTS

| | | | | |
|---|---|---|---|---|
| CN | 103733400 A | | 4/2014 | |
| JP | 2002-190298 A | | 7/2002 | |
| JP | 2005-158397 A | | 6/2005 | |
| JP | 4831946 B2 | | 12/2011 | |
| JP | 4108355 B2 | | 12/2012 | |
| JP | 2013-171713 A | | 9/2013 | |
| JP | 5546957 B2 | | 7/2014 | |
| JP | 2016-126901 A | | 7/2016 | |
| KR | 2002-0007581 A | | 1/2002 | |
| KR | 10-2012-0014542 A | | 2/2012 | |
| KR | 10-2013-0060937 A | | 6/2013 | |
| KR | 10-2014-0136217 A | | 11/2014 | |
| KR | 1020160010181 A | * | 1/2016 | |
| KR | 10-2016-0036855 A | | 4/2016 | |
| KR | 10-2016-0040817 A | | 4/2016 | |
| KR | 10-2016-0040830 A | | 4/2016 | |
| KR | 10-2016-0041299 A | | 4/2016 | |
| KR | 10-2016-0051660 A | | 5/2016 | |
| KR | 10-2016-0076798 A | | 7/2016 | |
| KR | 10-2016-0010181 A | | 10/2016 | |
| WO | WO 2013/187559 | | 12/2013 | |
| WO | WO-2013187559 A1 | * | 12/2013 | ........ H01M 10/0525 |

OTHER PUBLICATIONS

English translation of the Written Opinion of the International Searching Authority for PCT/KR2017/009586, Feb. 13, 2018, 8 pages. (Year: 2013).*

International Search Report (PCT/ISA/210) issued in PCT/KR2017/009586, dated Feb. 13, 2018.

Extended European Search Report for Application No. 17847037.3, dated Sep. 24, 2018.

* cited by examiner

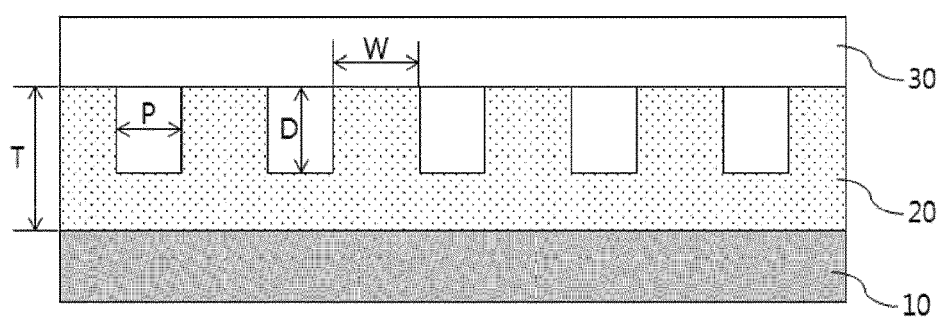
100

METHOD FOR MANUFACTURING ELECTRODE FOR LITHIUM SECONDARY BATTERY, AND ELECTRODE FOR LITHIUM SECONDARY BATTERY MANUFACTURED THEREBY

TECHNICAL FIELD

This application claims the benefits of Korean Patent Application No. 10-2016-0112645, filed on Sep. 1, 2016, with the Korean Intellectual Property Office and Korean Patent Application No. 10-2017-0111351, filed on Aug. 31, 2017, with the Korean Intellectual Property Office, the disclosure of which are herein incorporated by reference in its entirety.

The present invention relates to a method for preparing an electrode for a lithium secondary battery capable of enhancing lithium secondary battery performance and life time properties while preventing electrode active material desorption, and an electrode for a lithium secondary battery prepared using the same.

BACKGROUND ART

With increases in technology developments and demands for mobile devices, demands for secondary batteries as an energy source have rapidly increased. Among the secondary batteries, lithium secondary batteries having high energy density and operating potential, a long cycle life and a low self-discharge rate have been commercialized and widely used.

In addition, as interests in environmental problems have recently increased, studies on electric vehicles (EV), hybrid electric vehicles (HEV) and the like that may replace vehicles using fossil fuel such as gasoline vehicles and diesel vehicles, one or major reasons of air pollution, have been much progressed. Nickel hydrogen metal (Ni-MH) secondary batteries are normally used as a power source of the electric vehicles (EV), hybrid electric vehicles (HEV) and the like, however, studies on using lithium secondary batteries having high energy density, high discharge voltage and high output stability have been actively progressed and some of these have been commercialized.

A lithium secondary battery has a structure of a non-aqueous electrolyte including a lithium salt being impregnated into an electrode assembly having a porous separator provided between a positive electrode and a negative electrode in which each active material is coated on an electrode current collector. Such a lithium secondary battery is charged and discharged while repeating a process of lithium ions of the positive electrode being intercalated/deintercalated to the negative electrode.

Generally, capacity of a lithium secondary battery varies depending on the types of an electrode active material, however, problems of reducing charge and discharge capacity mostly occur as a cycle progresses. A biggest reason of such a phenomenon is that an active material is not capable of fulfilling its function due to an increase in the internal resistance while the active materials or the active material and a current collector are separated with changes in the electrode volume occurring as charge and discharge of a lithium secondary battery are progressed. In addition, lithium ions absorbed to the negative electrode do not properly escape during the lithium ion intercalation/deintercalation causing a negative electrode active site decrease, and as a result, charge and discharge capacity and life time properties of the lithium secondary battery decline as a cycle progresses.

Particularly, when using silicon (4,200 mAh/g) or lithium metal (3,860 mAh/g) exhibiting a high theoretical capacity property at room temperature as a negative electrode active material in order to increase discharge capacity, changes in the volume of the electrode caused by the reaction with lithium are high of 200% to 300% during charge and discharge, or binding strength for a current collector is insufficient resulting in a rapid battery capacity decrease due to active material desorption from the current collector, which makes commercialization difficult.

In addition, when increasing an active material loading amount per unit area of the electrode, adhesive strength between the active materials or between the active material and the current collector becomes insufficient causing peel-off from the current collector. When increasing a content of a binder in view of the above, resistance of the electrode increases leading to a disadvantage of reducing capacity and conductivity of the electrode.

Accordingly, various methods have been studied in order to prevent peel-off between an electrode active material and a current collector and improving an adhesion property between these or between active materials.

As one example, Korean Patent Publication No. 2016-0041299 discloses that adhesive strength and conductivity with an electrode mixture may be improved using a current collector having a conductive adhesive portion coated on one surface of the current collector in an area of 20% to 50% with respect to the area of the one surface.

In addition, Korean Patent Publication No. 2016-0040830 discloses that, in a multilayer-structured electrode including a primer layer between a current collector and an electrode mixture layer including an electrode active material, adhesive strength at a current collector interface and in the active material may be enhanced even in a high-loading electrode by the primer layer and the electrode mixture layer using binders each having a different glass transition temperature $(T_g)$.

However, although these patents have somewhat improved binding strength of an active material for a current collector, volume changes are still present, and contact loss between active materials becomes large as a cycle progresses. Accordingly, development of an electrode having excellent adhesive strength and capable of enhancing a battery cycle property by improving structural stability of the electrode while having high theoretical capacity has been increasingly required.

PRIOR ART DOCUMENTS

Patent Document

Korean Patent Publication No. 2016-0041299 (2016 Apr. 18), Electrode for secondary battery having current collector with improved structural stability Korean Patent Publication No. 2016-0040830 (2016 Apr. 15), Multilayer-structured electrode and lithium secondary battery comprising the same

DISCLOSURE

Technical Problem

In view of the above, the inventors of the present invention have conducted extensive studies, and have identified that mutual binding strength between a current collector and an electrode layer is improved by inserting a patterned primer layer therebetween and thereby increasing an area of contact.

Accordingly, an aspect of the present invention is to form a nanometer-sized concave pattern by irradiating an ion beam on a surface of a primer layer provided between a current collector and an electrode layer.

Another aspect of the present invention is to provide an electrode for a lithium secondary battery prepared through the preparation method.

Technical Solution

According to an aspect of the present invention, there is provided a method for preparing an electrode for a lithium secondary battery including forming a primer layer including a conductor on a current collector; forming a patterned primer layer by forming a concave pattern through irradiating an ion beam over the whole primer layer surface; and forming an electrode layer including an electrode active material on the patterned primer layer.

The ion beam comprises at least one selected from the group consisting of argon, oxygen, nitrogen, acetic acid, methane, carbon tetrafluoride, silane, ammonia and trimethyl aluminum.

The ion beam is irradiated for 1 second to 60 minutes with energy of 1 keV to 500 keV.

The patterned primer layer has a thickness of 0.1 μm to 10 μm.

A ratio of a thickness of the patterned primer layer to a maximum depth of the concave pattern is from 1:0.01 to 1:0.90.

The concave pattern has a width of 1 nm to 1000 nm, and the concave pattern has a pitch of 0.5 nm to 800 nm.

The conductor comprises at least one selected from the group consisting of natural graphite, artificial graphite, graphene, carbon black, denka black, acetylene black, ketjen black, Super-P, channel black, furnace black, lamp black, thermal black, carbon nanotubes, graphite nanofibers, carbon nanofibers, aluminum, nickel, zinc oxide, potassium titanate, titanium oxide and polyphenylene derivatives.

The patterned primer layer further comprises a binding agent.

The electrode is a positive electrode or a negative electrode.

According to another aspect of the present invention, there is provided an electrode for a lithium secondary battery prepared using the preparation method described above, and having a patterned primer layer disposed between a current collector and an electrode layer.

Advantageous Effects

An electrode for a lithium secondary battery prepared using a method for preparing an electrode for a lithium secondary battery according to the present invention is capable of readily forming a nanometer-level concave pattern by irradiating an ion beam on a primer layer surface.

Accordingly, in the electrode for a lithium secondary battery prepared using the above-mentioned preparation method, binding strength of an electrode layer including an electrode active material for a current collector increases by a patterned primer layer having a concave pattern formed on the surface, and this prevents peel-off of the electrode active material enhancing structural stability and electrical conductivity of the electrode. In addition, a capacity property and a cycle property of a lithium secondary battery including the electrode may be improved.

DESCRIPTION OF DRAWINGS

FIG. 1 is a mimetic diagram illustrating a sectional structure of an electrode for a lithium secondary battery prepared according to one embodiment of the present invention.

BEST MODE

Hereinafter, the present invention will be described in detail with reference to accompanying drawings. Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Accordingly, drawings included in the present specification and constitutions described in the embodiments are just one most preferred embodiment of the present invention, and do not represent all technological ideas of the present invention, and therefore, it needs to be understood that various equivalents and modification examples that may replace these may be present at the time of application of the present invention.

As applications of lithium secondary batteries expand starting from mobile phones, wireless electronic devices to electric vehicles, demands for lithium secondary batteries having high capacity and high stability have increased.

In order to increase non-reversible capacity of a battery, silicon (4,200 mAh/g) or lithium metal (3,860 mAh/g) with high theoretical capacity is used as a negative electrode active material, or the loading amount of an electrode active material is increased.

However, using the aforementioned negative electrode active material adversely affects battery capacity and life time properties since changes in the volume of an active material with charge and discharge is very high of up to 300% or active material desorption from a current collector occurs due to insufficient adhesion of the active material itself. In addition thereto, precipitates are formed on the surface to increase physical and chemical instability of a lithium secondary battery. Meanwhile, when increasing an amount of an electrode active material, a content of a binder included for aggregating electrode active materials and coating on a current collector also increases proportionally. Such an excessive binder use increases resistance and lowers conductivity of an electrode decreasing battery capacity. In addition, the electrode active material may be peeled off from a current collector due to changes in the volume during repeated charge and discharge.

Accordingly, an alloy has been formed or a separate layer for enhancing an adhesion property and conductivity has been introduced in the art, however, desorption of an active material has not been effectively suppressed.

In view of the above, the present invention provides a method for preparing an electrode for a lithium secondary battery forming a concave pattern on a surface of a primer layer introduced between a current collector and an electrode active material through an ion beam in order to enhance performance and life time of a lithium secondary battery by securing binding strength between the current collector and the electrode active material.

Specifically, the method for preparing an electrode for a lithium secondary battery according to the present invention includes forming a primer layer including a conductor on a current collector; forming a patterned primer layer by forming a concave pattern through irradiating an ion beam over the whole primer layer surface; and forming an electrode layer including an electrode active material on the patterned primer layer.

Hereinafter, the method for preparing an electrode for a lithium secondary battery according to the present invention will be specifically examined by each step.

First, the method for preparing an electrode for a lithium secondary battery according to one embodiment of the present invention includes forming a primer layer including a conductor on a current collector.

The current collector performs a role of collecting electrons produced by an electrochemical reaction of an electrode active material or supplying electrons needed for an electrochemical reaction, and is not particularly limited as long as it has excellent conductivity without inducing chemical changes to a lithium secondary battery. Examples thereof may include copper, stainless steel, aluminum, nickel, titanium, baked carbon; aluminum-cadmium alloys; copper, stainless steel or aluminum of which surface is treated with carbon, nickel, titanium or silver; non-conductive polymers of which surface is treated with a conductor; conductive polymers; metal pastes including metal powders such as Ni, Al, Au, Ag, Pd/Ag, Cr, Ta, Cu, Ba or ITO; carbon paste including carbon powder such as graphite, carbon black or carbon nanotubes.

The current collector may strengthen binding strength with an electrode active material by forming micro-unevenness on its surface, and various forms such as films, sheets, foil, nets, porous bodies, foams and non-woven fabrics may be used.

The thickness of the current collector is not particularly limited, and may be properly determined depending on the applications. For example, the current collector may have a thickness of 1 μm to 500 μm, preferably 5 μm to 300 μm and more preferably 10 μm to 150 μm. When the thickness of the current collector is less than the above-mentioned range, durability decreases, and when the thickness is greater than the above-mentioned range, capacity per volume of a lithium secondary battery may decrease.

The primer layer performs a role of increasing adhesive strength of an electrode layer for the current collector while suppressing an increase in the internal resistance of the electrode to the maximum, and includes a conductor.

The conductor is not particularly limited as long as it is a component electrically connecting the current collector and an electrode active material and maintains conductivity. Examples of the conductor may comprise at least one selected from the group consisting of natural graphite, artificial graphite, graphene, carbon black, denka black, acetylene black, ketjen black, Super-P, channel black, furnace black, lamp black, thermal black, carbon nanotubes, graphite nanofibers, carbon nanofibers, aluminum, nickel, zinc oxide, potassium titanate, titanium oxide and polyphenylene derivatives.

The primer layer fixes the conductor on the current collector, forms a coating film (paint film), and may include a binding agent for facilitating binding between the current collector and an electrode layer. Examples thereof may comprise at least one selected from the group consisting of polyvinylidene fluoride, polyvinyl alcohol, carboxymethylcellulose (CMC), starch, hydroxypropylcellulose (HPC), regenerated cellulose, polyvinyl pyrrolidone, tetrafluoroethylene, polyethylene, polypropylene, an ethylene-propylene-diene monomer (EPDM), a sulfonated EPDM, styrene butadiene and fluorine rubber.

When the primer layer includes both the conductor and the binding agent, a weight ratio of the conductor and the binding agent may be from 1:10 to 10:1, and preferably from 3:7 to 7:3. When the weight ratio is less than the above-mentioned range, the conductor content is too low declining battery operation properties due to an increase in the internal resistance, and when the content is greater than the above-mentioned range, the binding agent content is too low unable to obtain sufficient binding strength.

As the method of forming the primer layer, coating film-forming methods commonly used in the art may be used. For example, methods of wet coating such as gravure coating, slot die coating, spin coating, spray coating, bar coating or deposition coating; dry coating such as thermal evaporation, e-beam evaporation, chemical vapor deposition (CVD) or sputtering, and the like may be used.

The primer layer may have a thickness of 0.1 μm to 10 μm and preferably 0.1 μm to 5 μm. When the primer layer thickness is less than the above-mentioned range, binding strength between the current collector and an electrode layer may not be sufficiently secured and a uniform layer is difficult to form, and when the thickness is greater than the above-mentioned range, the primer layer may be resistive and may reduce electrical performance of the electrode or increase a volume of the electrode.

Subsequently, the method for preparing an electrode for a lithium secondary battery according to one embodiment of the present invention includes forming a patterned primer layer by forming a concave pattern through irradiating an ion beam over the whole primer layer surface.

In the present invention, binding strength between the current collector and an electrode layer may be enhanced by forming a concave pattern over the whole primer layer surface through an ion beam and thereby increasing an area of contact with the electrode layer to be described later.

Particularly, a nanometer-level pattern may be readily obtained by using an ion beam when forming the concave pattern, and adhesive strength between the current collector and the electrode layer may be strengthened by maximizing an area of adhesion due to a micropattern. Accordingly, structural stability and electrical conductivity of the electrode may be effectively maintained by an electrode active material being solidly adhered to the current collector even with changes in the volume of the electrode active material during charge and discharge, and performance and life time decline of a lithium secondary battery including the same may be prevented.

The ion beam may comprise at least one selected from the group consisting of argon (Ar), oxygen ($O_2$), nitrogen ($N_2$) r acetic acid ($CH_3COOH$), methane ($CH_4$), carbon tetrafluoride ($CF_4$), silane ($SiH_4$), ammonia ($NH_3$) and trimethyl aluminum (($CH_3)_3Al$), and may preferably be an ion beam including Ar.

The ion beam may be irradiated for 1 second to 60 minutes and preferably for 10 seconds to 30 minutes. In addition, the ion beam may be irradiated with energy in a range of 1 keV to 500 keV and preferably in a range of 1 to 250 keV. When the time and the energy of ion beam irradiation are less than the above-mentioned ranges, the concave pattern may be non-uniformly formed, and when the time and the energy are greater than the above-mentioned range, the current collector at the bottom of the primer layer is exposed due to excessive irradiation decreasing adhesive strength between the current collector and the electrode layer.

In the present invention, the form of the concave pattern is not particularly limited as long as it is generally used in the art. In addition, the concave pattern may have a shape of a continuous pattern or a discontinuous pattern.

The cross section of the concave pattern may be at least one selected from the group consisting of quadrangles, reversed trapezoids, curves, circles, ovals and polygons.

Herein, the concave pattern may have a round edge, an inclined edge, a pyramid edge or an irregular edge in order to uniformize current density without leaving pattern-forming residues.

As illustrated in FIG. 1, a patterned primer layer (20) is formed by forming a concave pattern over the whole surface of the primer layer formed on the current collector (10) through irradiating the ion beam under the above-mentioned condition.

When referring to FIG. 1, a ratio of the thickness (T) of the patterned primer layer (20) to the maximum depth (D) of the concave pattern may be from 1:0.01 to 1:0.90 and preferably from 1:0.10 to 0.75. In addition thereto, the width (W) of the concave pattern may be from 1 nm to 1000 nm and preferably from 10 nm to 900 nm. In addition, the pitch (P) of the concave pattern may be from 0.5 nm to 800 nm and preferably from 5 nm to 500 nm. Herein, the width (W) of the concave pattern means the longest width in the width of the concave pattern measured in a horizontal direction, the pitch (P) means an interval between the highest point s of the concave pattern, and the maximum depth (D) means a vertical distance from the highest point to the lowest point of the concave pattern. When the ratio of the thickness (T) of the patterned primer layer (20) to the maximum depth (D) of the concave pattern, the width (W) of the concave pattern, and the pitch (P) of the concave pattern correspond to the above-mentioned ranges, the concave pattern is uniformly formed and a target effect of increasing an area of contact may be obtained.

Next, the method for preparing an electrode for a lithium secondary battery according to one embodiment of the present invention includes forming an electrode layer including an electrode active material on the patterned primer layer.

The electrode active material is not particularly limited as a material used in a lithium secondary battery, and the following materials may be diversely used.

Examples of the electrode active material may include, as a positive electrode active material, layer compounds such as lithium cobalt oxide ($LiCoO_2$) or lithium nickel oxide ($LiNiO_2$) or compounds substituted with one or more transition metals; lithium manganese oxide such as a chemical formula of $Li_{1+x}Mn_{2-x}O_4$ ($0 \leq x \leq 0.33$), $LiMnO_3$, $LiMn_2O_3$ or $LiMnO_2$; lithium copper oxide ($Li_2CuO_2$); vanadium oxide such as $LiV_3O_8$, $LiFe_3O_4$, $V_2O_5$ or $Cu_2V_2O_7$; Ni site-type lithium nickel oxide represented by a chemical formula of $LiNi_{1-x}M_xO_2$ (M=Co, Mn, Al, Cu, Fe, Mg, B or Ga; $0.01 \leq x \leq 0.3$); lithium manganese composite oxide represented by a chemical formula of $LiMn_{2-x}M_xO_2$ (M=Co, Ni, Fe, Cr, Zn or Ta; $0.01 \times 0.1$) or $Li_2Mn_3MO_8$ (M=Fe, Co, Ni, Cu or Zn); spinel-structured lithium manganese composite oxide represented by $LiNi_xMn_{2-x}O_4$; $LiMn_2O_4$ in which some of Li in the chemical formula are substituted with alkaline earth metal ions; disulfide compounds; $Fe_2(MoO_4)_3$ and the like, but are not limited thereto.

Examples of the electrode active material may include, as a negative electrode active material, one or more carbon-based materials selected from the group consisting of crystalline artificial graphite, crystalline natural graphite, amorphous hard carbon, low crystalline soft carbon, carbon black, acetylene black, ketjen black, Super-P, graphene and fibrous carbon, Si-based materials, metal composite oxides such as $Li_xFe_2O_3$ ($0 \leq x \leq 1$), $Li_xWO_2$ ($0 \leq x \leq 1$) or $Sn_xMe_{1-x}Me'_yO_z$ (Me: Mn, Fe, Pb, Ge; Me': Al, B, P, Si, elements of groups 1, 2 and 3 in the periodic table, halogen; $0<x \leq 1$; $1 \leq y \leq 3$; $1 \leq z \leq 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ or $Bi_2O_5$; conductive polymers such as polyacetylene; Li—Co—Ni-based materials; titanium oxide; lithium titanium oxide, and the like, but are not limited thereto.

The electrode layer may further include a binding agent, a conductor, a filler and the like as necessary in addition to the electrode active material described above.

Types of the binding agent and the conductor are the same as described above.

The filler is not particularly limited as long as it is a fibrous material that suppresses electrode expansion and does not induce chemical changes to a lithium secondary battery. For example, olefin-based polymers such as polyethylene and polypropylene; fibrous materials such as glass fiber or carbon fiber may be used.

The electrode layer may be formed by coating the electrode active material on the current collector, and drying and pressing the result.

In addition, the present invention provides an electrode for a lithium secondary battery prepared using the preparation method described above.

The electrode may be a positive electrode or a negative electrode.

Particularly, the preparation method according to the present invention forms a nanometer-sized concave pattern on the whole surface of a primer layer introduced between a current collector and an electrode layer through irradiating an ion beam, and thereby increases an area of contact. Through the patterned primer layer, binding strength of the electrode layer for the current collector is enhanced improving structural stability and electrical conductivity of an electrode and a micropattern is readily formed through an ion beam irradiation process, which is advantageous in terms of process efficiency and productivity.

The electrode for a lithium secondary battery according to the present invention is a high loading electrode and uses an electrode active material having large changes in the volume, and is more suited for batteries in which peel-off readily occurs between a current collector and an electrode layer including an electrode active material, or between electrode active materials, and therefore, the electrode for a lithium secondary battery may be a negative electrode, and the electrode active material may be a Si-based material or lithium metal. The Si-based material may be one or more selected from the group consisting of $SiO_x$ ($0.5 \leq x \leq 2$), Si alloys and amorphous Si. In the Si alloy, the metal forming an alloy with Si is one or more metals selected from the group consisting of Mg, Al, Fe, Ni, Cu and Ga. The lithium metal may have a form of lithium foil or lithium metal powder.

In addition, the present invention provides a lithium secondary battery including an electrode for a lithium secondary battery prepared using the above-mentioned preparation method.

The lithium secondary battery has a structure of a non-aqueous electrolyte being impregnated into an electrode assembly including the electrode for a lithium secondary battery prepared according to the above-described preparation method and a separator.

As the separator, insulating thin films having high ion permeability and mechanical strength are used. The separator generally has a pore diameter of 0.01 μm to 10 μm and a thickness of 5 μm to 300 μm. For example, chemical resistant and hydrophobic olefin-based polymers such as polypropylene; sheets or nonwoven fabrics made of glass fiber, polyethylene or the like, and the like may be used. When using a solid electrolyte such as a polymer as the electrolyte, the solid electrolyte may also function as the separator at the same time.

The non-aqueous electrolyte is formed with a non-aqueous liquid electrolyte and a lithium salt, and as the non-aqueous liquid electrolyte, non-aqueous organic solvents, organic solid electrolytes, inorganic solid electrolytes and the like may be used, however, the non-aqueous electrolyte is not limited thereto.

Examples of the non-aqueous organic solvent may include aprotic organic solvents such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate.

Examples of the organic solid electrolyte may include polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers including an ionic dissociation group, and the like.

Examples of the inorganic solid electrolyte may include nitrides, halides, sulfates and the like of Li such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$ or $Li_3PO_4-Li_2S-SiS_2$.

The lithium salt may be used without limit as long as it is commonly used in a liquid electrolyte for a lithium secondary battery. Examples thereof may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenylborate, imide and the like.

In addition, with the purpose of improving charge and discharge properties and flame retardancy, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the lithium salt-containing non-aqueous electrolyte. In some cases, halogen-containing solvents such as carbon tetrachloride and trifluoroethylene may be further included in order to provide nonflammability, carbon dioxide gas may be further included in order to enhance high temperature storage properties, and fluoroethylene carbonate (FEC), propene sultone (PRS) and the like may be further included.

The shape of the lithium secondary battery is not particularly limited, and various shapes such as a cylinder-type, a lamination-type or a coin-type may be employed.

In addition, the present invention provides a battery module including the lithium secondary battery as a unit cell, and provides a battery pack including the battery module.

The battery pack may be used as a power supply of medium to large-sized devices requiring high temperature stability, a long cycle property and a high capacity property.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including e-bikes, e-scooters and the like; electric golf carts; systems for power storage and the like, but are not limited thereto.

Hereinafter, preferred examples will be provided in order to illuminate the present invention, however, the following examples are for illustrative purposes only, and it will be obvious to those skilled in the art that various changes and modifications may be made within the scope and technological ideas of the present invention, and such changes and modifications also belong to the scope of the attached claims.

EXAMPLE AND COMPARATIVE EXAMPLE

Example 1

On one surface of copper foil having a thickness of 10 μm, a composition for forming a primer layer including 5% by weight of denka black, 25% by weight of polyvinylidene fluoride and the remainder of NMP was coated, and the result was dried to form a primer layer having a thickness of 3 μm.

An argon (Ar) ion beam with 100 keV energy was irradiated on the primer layer surface for 1 minute to form a concave pattern having a quadrangular cross section (pattern maximum depth (D) 1 μm, pattern width (W) 100 μm, pattern pitch (P) 10 μm).

Lithium foil having a thickness of 20 μm was laminated on the patterned primer layer to prepare a negative electrode for a lithium secondary battery.

Example 2

A negative electrode for a lithium secondary battery was prepared in the same manner as in Example 1 except that, the electrode layer was formed by coating, instead of lithium foil, negative electrode slurry mixing graphite:carbon black: AD-B01 (manufactured by LGC) in a weight ratio of 95:2:3 to a thickness of 20 μm on the patterned primer layer, and then drying the result.

Example 3

A negative electrode for a lithium secondary battery was prepared in the same manner as in Example 1, except that, when forming the concave pattern, a concave pattern having a globular cross section (pattern maximum depth (D) 2 μm, pattern width (W) 100 μm, pattern pitch (P) 10 μm) was formed by irradiating a $CF_4$ ion beam with 150 keV energy for 5 minutes.

Example 4

A positive electrode for a lithium secondary battery was prepared in the same manner as in Example 1 except that, the electrode layer was formed by coating, instead of lithium foil, positive electrode slurry mixing $LiNi_{0.6}Co_{0.2}Mn_{0.2}O_2$ (NCM 622):Super-P:polyvinylidene fluoride in a weight ratio of 95:2.5:2.5 to a thickness of 20 μm on the patterned primer layer, and then drying the result.

Comparative Example 1

A negative electrode for a lithium secondary battery was prepared in the same manner as in Example 1 except that the primer layer was not formed.

Comparative Example 2

A negative electrode for a lithium secondary battery was prepared in the same manner as in Example 1 except that no pattern was formed on the primer layer surface.

Comparative Example 3

A negative electrode for a lithium secondary battery was prepared in the same manner as in Example 1 except that a pattern was formed on the primer layer surface through microcontact printing.

Experimental Example 1. Evaluation on Contact Property

For each of the negative electrodes for a lithium secondary battery prepared according to the examples and the comparative examples, the area of contact was calculated through optical microscope observation, and adhesive strength was measured using an adhesive strength measuring device (LR-5K, manufactured by LLOYD Instruments). Results obtained herein are shown in the following Table 1.

TABLE 1

| | Area of Contact (mm$^2$) | Adhesive Strength (gf) |
|---|---|---|
| Example 1 | 35 | 23 |
| Example 2 | 36 | 24 |
| Example 3 | 50 | 35 |
| Example 4 | 35 | 25 |
| Comparative Example 1 | 0 | 5 |
| Comparative Example 2 | 20 | 10 |
| Comparative Example 3 | 27 | 15 |

Experimental Example 2. Evaluation on Lithium Secondary Battery Properties (1) Examples 1 to 3 and Comparative Examples 1 to 3

After preparing positive electrode active material slurry formed with $LiCoO_2$ as a positive electrode active material, Super P as a conductor and polyvinylidene fluoride (PVDF) as a binder in 95% by weight, 2.5% by weight and 2.5% by weight, respectively, the positive electrode active material slurry was coated on an aluminum current collector, and the result was dried to prepare a positive electrode.

Each of the electrodes prepared according to Examples 1 to 3 and Comparative Examples 1 to 3 was used as a negative electrode.

(2) Example 4

The electrode prepared according to Example 4 was used as a positive electrode.

Lithium foil having a thickness of 20 μm was used as a negative electrode.

After inserting an electrode assembly provided with a polypropylene-based porous membrane between the positive electrode and the negative electrode prepared in each of (1) and (2) into a pouch-type battery case, a non-aqueous liquid electrolyte (1 M $LiPF_6$, EC:EMC=3:7 (volume ratio)) was injected into the battery case, and the result was completely sealed to manufacture a lithium secondary battery.

The manufactured lithium secondary battery was constant current charged up to 5 mV with currently density of 0.5 C during charge, and 5 mV was constantly maintained with a constant voltage and charge was terminated when current density became 0.005 C. Discharge was completed in a constant current mode to 1.5 V with current density of 0.5 C during discharge. Charge and discharge were repeated 50 times under the same condition. Results obtained herein are shown in the following Table 2.

TABLE 2

| Used Electrode | Initial Charge and Discharge Efficiency (%) | 1$^{st}$ Discharge Capacity (mAh/g) | Capacity Retention Rate (% @50$^{th}$ cycle) |
|---|---|---|---|
| Example 1 | 95 | 36 | 95 |
| Example 2 | 94 | 37 | 99 |
| Example 3 | 95 | 37 | 99 |
| Example 4 | 94 | 38 | 98 |
| Comparative Example 1 | 85 | 32 | 50 |
| Comparative Example 2 | 90 | 34 | 60 |
| Comparative Example 3 | 95 | 36 | 80 |

Based on Table 1, it was identified that the examples according to the preparation method of the present invention had excellent area of contact and adhesive strength compared to the comparative examples. In other words, by forming a concave pattern on the primer layer surface as in the examples, the area of contact increased and binding strength of the electrode layer for the current collector was enhanced, and as a result, structural stability and conductivity of the electrode were improved.

In addition, as shown in Table 2, it was identified that the examples including a patterned primer layer had excellent initial charge and discharge efficiency and capacity properties compared to the comparative examples.

REFERENCE NUMERAL

100: Electrode for Lithium Secondary Battery
10: Current Collector
20: Patterned Primer Layer
30: Electrode Layer

INDUSTRIAL APPLICABILITY

The preparation method for a lithium secondary battery of the present invention is capable of effectively forming a micropattern on a primer layer surface, and improves adhesion properties between a current collector and an electrode active material therethrough allowing a lithium secondary battery to have high capacity, high stability and long life time.

The invention claimed is:

1. A method for preparing an electrode for a lithium secondary battery comprising:
   forming a primer layer including a conductor on a current collector;
   forming a patterned primer layer by forming a concave pattern through irradiating an ion beam over the whole primer layer surface; and
   forming an electrode layer including an electrode active material on the patterned primer layer,
   wherein a ratio of a thickness of the patterned primer layer to a maximum depth of the concave pattern is from 1:0.01 to 1:0.90.

2. The method for preparing an electrode for a lithium secondary battery of claim 1, wherein the ion beam comprises at least one of argon, oxygen, nitrogen, acetic acid, methane, carbon tetrafluoride, silane, ammonia and trimethyl aluminum.

3. The method for preparing an electrode for a lithium secondary battery of claim 1, wherein the ion beam is irradiated for 1 second to 60 minutes.

4. The method for preparing an electrode for a lithium secondary battery of claim 1, wherein the ion beam is irradiated with energy of 1 keV to 500 keV.

5. The method for preparing an electrode for a lithium secondary battery of claim 1, wherein a thickness of the patterned primer layer is from 0.1 μm to 10 μm.

6. The method for preparing an electrode for a lithium secondary battery of claim 1, wherein a width of the concave pattern is from 1 nm to 1000 nm, and a pitch of the concave pattern is from 0.5 nm to 800 nm.

7. The method for preparing an electrode for a lithium secondary battery of claim 1, wherein the conductor comprises at least one of natural graphite, artificial graphite, graphene, carbon black, denka black, acetylene black, ketjen black, Super-P, channel black, furnace black, lamp black, thermal black, carbon nanotubes, graphite nanofibers, carbon nanofibers, aluminum, nickel, zinc oxide, potassium titanate, titanium oxide and polyphenylene derivatives.

8. The method for preparing an electrode for a lithium secondary battery of claim 1, wherein the patterned primer layer further comprises a binding agent.

9. The method for preparing an electrode for a lithium secondary battery of claim 1, wherein the electrode is a positive electrode or a negative electrode.

10. An electrode for a lithium secondary battery prepared using the method of claim 1, the electrode comprising a primer layer located between a current collector and an electrode layer.

* * * * *